Patented Apr. 25, 1950

2,505,079

UNITED STATES PATENT OFFICE 2,505,079

MANUFACTURE OF GEL COMPOSITIONS

Otis W. Allen, East Point, Ga., assignor to International Minerals & Chemical Corporation, a corporation of New York No Drawing. Application September 3, 1948, Serial No. 47,751

8 Claims. (Cl. 252—317)

This invention relates to an improved process for the hydration of hygroscopic compositions which decrepitate when in contact with liquid water. More particularly, the invention relates to an improved process for the hydration of the aforesaid compositions, followed by impregnating the hydrated compositions with an impregnating agent.

Hygroscopic compositions such as synthetic metal oxide gels and the like, which may contain either one or a plurality of metal oxides, are used for a wide variety of purposes, among which may be mentioned dehydrating agents in refrigeration systems, dehumidifying apparatus and dessicants for packaged materials. Such gels are also useful as bases for catalysts which are employed in the petroleum industry in such processes as the cracking, hydroforming, alkylation and polymerization of hydrocarbons. The conventional method of preparing such metal oxide gels involves adding an acidic solution which may or may not contain a metal salt to an alkaline solution which usually contains a metal-containing anion, resulting in the precipitation of metal oxide hydrogels. For example, a silicic acid gel which may be used to manufacture either a dessicant material or a catalyst support may be prepared by mixing hydrochloric acid or sulfuric acid solution with a solution of sodium silicate or "water glass" and permitting the resulting solution to stand until the silicic acid precipitates or forms a cohesive gel. The structure of the hydrogel as well as that of the ultimate anhydrous product which is to be produced will depend upon the concentration of the reactants, upon the temperature of the gelation reaction, upon the pH of the resultant admixed solutions, and upon the time required for gelation. Hydrogels containing either one or a plurality of metal oxides such as gels comprising precipitated oxides of iron, aluminum, vanadium, copper, manganese, chromium or mixtures of said oxides are prepared by admixing appropriate acidic and basic solutions containing salts of such metals. The resultant precipitated hydrogel is usually dehydrated by breaking the hydrogel into particles of suitable size and drying the same at elevated temperatures, usually above 200° F.

It has been standard practice to impregnate the substantially anhydrous gel products described above by adding thereto an aqueous solution of a composition which is capable of being converted into a different catalytic substance, usually by heating or calcining the impregnated gel at elevated temperatures. For example, a solution of aluminum nitrate or aluminum chloride may be added to anhydrous silica gel, permitting the resultant mixture to stand until a suitable amount of aluminum compound has been absorbed by the gel. The resulting impregnated, hydrated gel is then heated at elevated temperatures, whereupon the aluminum salt decomposes into aluminum oxide which remains precipitated in the gel structure while the cationic portion of the aluminum salt is converted into volatile gases such as oxides of nitrogen, and hydrogen chloride. Other soluble salts of such metals as copper, zinc, platinum, manganese and chromium may be precipitated in gel structures in a similar manner in order to produce a particular catalytic substance. This drying or calcining operation usually results in a substantial shrinkage of the hydrogel particles and results in a product in which internal stresses and strains have been set up. It is generally known that upon adding such aqueous solutions to substantially anhydrous metal oxide gels such as silica gel, the gel absorbs the impregnating solution so rapidly that the gel particles are shattered, thereby greatly reducing the size of the gel particles. This requires a further sizing operation following the ultimate calcining step and results in the loss of a substantial amount of the original gel product due to the fines which are produced as a result of the shattering of the gel. It has been proposed previously to circumvent this particular difficulty by only partially dehydrating the original precipitated hydrogel, for example, until the moisture content of the hydrogel has been reduced to between about 20 and about 60% by weight. Such procedures are described in patents issued to Patrick, No. 1,695,740, and to McKinney, No. 2,147,985. However, it has been observed that when partially dried hydrogels are impregnated with aqueous solutions of metallic salts of the type herein previously described and the resultant impregnated hydrogel is then further dried to a moisture content of between about 5 and about 7% by weight, an appreciable amount of shrinkage of the hydrogel particles occurs, resulting in a product whose particle size is smaller than that of the hydrogel being impregnated. It has also been proposed to subject substantially anhydrous silica gel or other metal oxide gels of the type herein previously described to the action of a mixture of steam and air. Such a process is described in a patent issued to Stoewener, No. 1,798,766. This process requires a substantial investment in processing equipment and a reasonable amount of care must be exercised in order to prevent condensation of water in the steam chambers upon the dry gel. Such condensation would cause the shattering or decrepitation of the gel, which is objectionable for the reasons hereinbefore set forth.

It is an object of the invention to provide an improved process for the hydration of hygroscopic compositions which decrepitate when in contact with liquid water, and to minimize such decrepitation.

It is a further object of the invention to provide an improved process for the hydration of substantially anhydrous synthetic metal oxide gels which decrepitate when in contact with liquid water.

It is a further object of the invention to provide an improved process for the impregnation of synthetic metal oxide gels with aqueous liquids which contain an impregnating agent.

It is a further object of the invention to provide an improved process for the impregnation of substantially anhydrous silica gel with certain aqueous compositions which render the resultant impregnated gel amenable to use as a dessicant, and as a catalyst for a variety of purposes while minimizing decrepitation.

It is still a further object of the invention to provide an improved process for the production of a dessicant grade silica gel which is impregnated with a moisture indicator such as cobaltous chloride.

The above objects, as well as others which will become apparent upon a complete understanding of the invention which is hereinafter fully described, are accomplished by subjecting a hygroscopic composition which will decrepitate when in contact with liquid water to the action of ice. It has been found that when hygroscopic compositions such as synthetic metal oxide gels and the like are admixed with ice in certain proportions, the resultant product will be a gel which is substantially hydrated with water. Such a hydration process is characterized by almost complete freedom from decrepitation or shattering of the initially dry gel composition. The hydroscopic compositions which may be treated with ice in accordance with the instant process include those solid, porous, synthetic gels which may contain only one metal oxide such as oxide of iron, aluminum, chromium, copper, zirconium, thorium, vanadium, manganese, silicon and the like, or mixtures of any of the said oxides which have been activated by a heating or calcining procedure to reduce the water content thereof. Also included within the term "hygroscopic compositions" are natural diatomaceous compositions such as fuller's earth, infusorial earths and the like which have been calcined and/or acid treated in order to activate said compositions for use as catalysts, dessicants, etc. Such heated or calcined products are believed to contain internal stresses or strains which have been set up therein during the heating or calcining procedure. These physical properties of the dry materials are believed to cause the shattering or decrepitation of said materials when they are admixed with water or an aqueous solution of an impregnant. On the other hand, when such substantially anhydrous compositions are treated with ice in accordance with the instant process, the resultant hydrated product is substantially the same mesh size as the original product, and this mesh size is retained in any subsequent heating or calcining procedure which may be employed to reactivate the impregnated gel composition. A substantially anhydrous, porous gel or similar composition which has been treated with ice in a suitable amount in order to produce a hydrated product which will be substantially saturated with water when the ice has vaporized into the pores of the gel may be readily treated with solutions containing impregnating agents, and such impregnating treatment causes substantially no deformation or decrepitation of the hydrated product. The resultant impregnated hydrated product may then be treated in any conventional manner in order to produce the anhydrous impregnated product desired. In the event that a catalytic type of gel is required, the synthetic metal oxide gel which has been treated with ice may be admixed with a solution of a compound which is capable of forming a catalytic agent upon further chemical or physical treatment. This includes the addition of either acids or bases to the hydrated gel composition which contains a metallic compound as a result of the impregnation step. This treatment will cause the precipitation of the hydroxide or oxide of the metallic impregnant within the pores of the gel. The resultant impregnated hydrated gel may then be calcined at elevated temperatures in order to produce a substantially anhydrous catalytic agent. Alternatively, the hydrated gel composition which has been impregnated with a solution of a metallic salt may be heated directly at elevated temperatures, thereby decomposing the metal salt into the oxide thereof, accompanied by the volatilization of the anionic portion of the metal salt impregnant as gaseous by-products. This causes the deposition of the oxide of the particular metal in question within the pores of the gel. The instant process is also useful for the preparation of dessicant type metal oxide gels, for example, silica gel, by hydrating silica gel of a suitable mesh size by adding ice thereto in an amount sufficient to cause the ultimate hydration of the gel. The hydrated gel may then be treated with a solution of a compound which will act as a moisture indicator. Cobaltous chloride is particularly adaptable to the production of dessicant grade silica gel in that when cobaltous chloride-containing silica gel is substantially dry, the product has a blue tint. Upon becoming saturated with water, the product assumes a pink coloration.

More particularly the instant process is conducted by admixing a suitable quantity of ice with a hygroscopic composition of the type previously herein described, and which decrepitates when in contact with liquid water, in an amount which will cause sufficient hydration of the hygroscopic composition to prevent the shattering or decrepitation thereof when it is subsequently treated with a solution of impregnating agent. The hygroscopic metal oxide gel compositions which may be so treated include those metal oxide gels previously mentioned herein which contain not more than about 10% by weight of water. The amount of water which any particular gel will tolerate without causing shattering of the gel during hydration with liquid water or other polar solvents such as methyl, ethyl and isopropyl alcohols will depend upon the particular metal oxide or oxides of which the gel is composed; upon the porosity of any particular gel; and upon the rate and extent of the removal of moisture therefrom during any prior heating and calcining procedure. In order to achieve the best results, a sufficient amount of ice should be added to the substantially anhydrous metal oxide gel, or to such a gel which contains not more than about 10% by weight of water, so that the hydrated gel which finally results will contain between about 40 and about 100% by weight of water (solid basis). A hydrated metal oxide gel containing water in such amounts is more amendable to the conventional impregnation procedures herein described. Therefore, a substantially anhydrous metal oxide gel which contains not more than about 10% by weight of water is preferably admixed with ice in an amount between about 40 and about 100 parts by weight of ice per 100 parts by weight of metal oxide gel. The resultant mixture is permitted to stand until the gel is substantially saturated by water. This may require a period of time between about 24 and about 96 hours, depending upon the temperature surrounding the gel-ice mixture and upon the particular type of gel being treated. The mixture is preferably placed in a sealed container such as a steel drum, barrel or other suitable receptacle which is substantially sealed from the atmosphere, but it is not essential to the operation of the instant process that such a storage procedure be employed. Alternatively, a metal oxide gel may be admixed with ice in the amounts previously herein set forth by employing a continuous procedure whereby the gel-ice mixture is placed on a suitable conveying mechanism and is permitted to remain thereon for a sufficient length of time until the gel becomes substantially saturated with water, the hydrated gel being removed continuously from the system.

Upon completion of the hydration of the hygroscopic metal oxide gel compositions in accordance with the instant process, the resultant hydrated gel composition may be then treated with a solution of any suitable active material for the purpose of preparing any particular catalytic agent, dessicant type gel or other composition. For example, a hydrated gel may be treated with a colloidal solution of platinum in accordance with the process set forth in Patent No. 1,577,188 issued to W. A. Patrick, whereby silica gel is impregnated with colloidal platinum. The metal oxide gel may also be impregnated with a solution of a water-soluble salt of a metal whose oxide has catalytic properties. In this class may be mentioned salts of metals such as copper, vanadium, nickel, aluminum and others. The amount of impregnating agent ultimately deposited in the hydrated gel will depend upon the concentration of the impregnating solution, upon the temperature of the mixture, upon the period of contact time between the hydrated gel and the impregnating solution, and upon the specific gravity of the particular impregnant solution. The resulting impregnated hydrated metal oxide gel may then be heated at elevated temperatures in order to decompose the metal salt contained in the gel, thereby producing a catalytic agent deposited in the pores of the gel. Usually temperatures between about 200° to 500° F. are sufficient for this purpose.

Synthetic metal oxide gels, particularly silica gel, have been universally employed as dessicants in refrigeration systems, as well as in a dehydrating capacity for packaged products. When substantially anhydrous silica gel is treated with a solution of a compound which will act as a moisture indicator such as aqueous cobaltous chloride, an appreciable amount of shattering or decrepitation occurs for reasons hereinbefore set forth. This results in appreciable losses in the gel product, as the fines produced in this phenomenon must be removed from the gel in order to produce a satisfactory, saleable product. However, when substantially anhydrous silica gel is treated with ice in accordance with the instant process, a solution containing a compound which will act as a moisture indicator may be added to the resultant hydrated gel and no appreciable shattering or decrepitation of the gel will occur. As a result, the ultimate dessicant product will have substantially the same mesh size as that of the original silica gel.

While it is the general procedure to employ an aqueous solution as an impregnating agent in the treatment of synthetic metal oxide gels and similar compositions, it is to be understood that solvents other than water may be employed in certain instances. For example, many of the heavy metal salts such as those of cobalt, nickel and others are soluble in alcohols and ether. Solutions of this type may also be employed for the impregnation of the gels. In some instances it is useful to employ a mixture of water and water-miscible organic solvents for the preparation of suitable impregnating agents, and all such methods are deemed to be within the scope of the instant process.

In order to more fully illustrate the nature and character of the invention, but with no intention of being limited thereby, the following example is set forth:

*Example*

Silica gel was prepared by adding with agitation a 25% aqueous solution of sodium silicate to an equal volume of a 10% aqueous solution of HCl. The specific gravity of the sodium silicate solution was about 1.185. After about 1 hour, the solution set to a homogeneous gel which is designated silica hydrogel. The hydrogel was broken into relatively small pieces and washed with water at a temperature of about 125° F. in order to remove salts and excess reagents therefrom. The pH of the wash water was about 4.5. The hydrogel was then dried in a current of air at a temperature between about 200° and about 250° F. until the gel structure only contained between about 5 and about 6% by weight of water. The substantially dry gel was then sized by a screening operation and a fraction of gel of −6 mesh to +16 mesh was selected for the preparation of a dessicant material.

The silica gel prepared as described above was admixed with about an equal weight of crushed ice and the resultant mixture was stored in a sealed container for about 48 hours. After this period of time, the ice had disappeared and the gel had become substantially saturated with water. The hydrated gel was then placed in a tank and covered with an aqueous solution of cobaltous chloride. This solution was prepared by dissolving cobaltous chloride in water to provide a solution having a specific gravity between about 1.028 and about 1.043 when measured at 100° F. The gel was allowed to remain in the cobaltous chloride solution until a sample, after draining and drying at a temperature of about 225° F., had a blue color equivalent to about 0.75 and about 1.25% by weight of anhydrous cobaltous chloride. The main body of the impregnated gel was then removed from the cobaltous chloride solution and the excess moisture removed therefrom by centrifugation. The resultant product was then dried at a temperature between about 250° and about 450° F. for approximately ¾ to 1½ hours. The resultant product contains a negligible amount of "fines" and has a more uniform particle size and color than cobaltous chloride gel which is produced by adding cobaltous chloride solution to substantially anhydrous silica gel or to partially dehydrated silica hydrogel.

The silica gel used in the above example may also be prepared by slowly adding in the form of a spray about 2 volumes of approximately 25% by weight sodium silicate solution to approximately 1 volume of about 20% by weight sulfuric acid, the latter being agitated during the addition of the sodium silicate solution. The gel may then be impregnated with the aqueous solution of cobaltous chloride as previously described.

While the above example illustrates the preparation of a silica gel dessicant, it is to be understood that the instant process is in no way limited thereto, but that any of the metal oxide gel compositions herein previously described may be hydrated with ice in a similar manner, or one equivalent thereto. The resulting hydrated metal oxide gel may then be impregnated with compositions which will render the final products useful as catalysts, dessicants or for other purposes. Furthermore, the instant process is not limited to the specific procedural details recited herein but equivalent modifications and extensions of the factors herein set forth may be employed.

Having thus fully described the nature and character of the invention, what is desired to be secured by Letters Patent is:

1. A method of impregnating a hygroscopic siliceous gel with a solution of impregnant which comprises, admixing said gel with ice in an amount sufficient to produce a hydrated gel substantially saturated with water, permitting the resultant mixture to stand until the gel is substantially saturated with water and treating the resultant product with a solution of impregnant agent.

2. A method of impregnating a hygroscopic silica gel with a solution of impregnant which comprises, admixing said gel with ice in an amount sufficient to produce a hydrated gel substantially saturated with water, permitting the resultant mixture to stand until the gel is substantially saturated with water and treating the resultant product with a solution of impregnant agent.

3. A method of impregnating a hygroscopic siliceous gel with an aqueous solution of impregnant which comprises, admixing said gel with ice in an amount sufficient to produce a hydrated gel substantially saturated with water, permitting the resultant mixture to stand until the gel is substantially saturated with water and treating the resultant product with an aqueous solution of impregnant agent.

4. A method of impregnating hygroscopic silica gel with an aqueous solution of impregnant which comprises, admixing said gel with ice in an amount sufficient to produce a hydrated gel substantially saturated with water, permitting the resultant mixture to stand until the gel is substantially saturated with water and treating the resultant product with an aqueous solution of impregnant agent.

5. A method of impregnating a hygroscopic siliceous gel with a solution of cobaltous chloride which comprises, admixing said gel with ice in an amount sufficient to produce a hydrated gel substantially saturated with water, permitting the resultant gel to stand until the gel is substantially saturated with water, and treating the resultant product with a solution of cobaltous chloride.

6. A method of impregnating a hygroscopic silica gel with an aqueous solution of cobaltous chloride which comprises, admixing said gel with ice in an amount sufficient to produce a hydrated gel substantially saturated with water, permitting the resultant gel to stand until the gel is substantially saturated with water, and treating the resultant product with an aqueous solution of cobaltous chloride.

7. A method of impregnating a hygroscopic silica gel which contains not more than about 10% by weight of water, which comprises admixing said gel with ice in an amount sufficient to produce a hydrated silica gel containing between about 40 and about 100% of its weight of water, permitting the resultant mixture to stand until the silica gel is substantially saturated with water, and treating the resultant product with an aqueous solution of cobaltous chloride.

8. A method of preparing silica gel which will act as a humidity indicator, which comprises admixing silica gel of between about −6 and about +16 mesh size and which contains about 5% by weight of water, with about an equal weight of comminuted ice; permitting the resultant mixture to stand until the gel is substantially saturated with water; treating the resultant hydrated gel with an aqueous solution of cobaltous chloride having a specific gravity between about 1.028 and about 1.043 at 100° F.; removing the cobaltous chloride solution from the hydrated gel when a sample of impregnated gel contains between about 0.75 and about 1.25% by weight of anhydrous cobaltous chloride, on a dry basis; and drying the resultant product at a temperature between about 250° and about 450° F.

OTIS W. ALLEN.

REFERENCES CITED

The following references are of record in the file of this patent:

UNITED STATES PATENTS

| Number | Name | Date |
| --- | --- | --- |
| 1,798,766 | Stoewener | Mar. 31, 1931 |
| 2,324,518 | Klein et al. | July 20, 1943 |
| 2,456,576 | Bodkin et al. | Dec. 14, 1948 |
| 2,460,071 | Davis | Jan. 25, 1949 |

FOREIGN PATENTS

| Number | Country | Date |
| --- | --- | --- |
| 393,094 | Great Britain | June 1, 1933 |